United States Patent [19]
Guttman et al.

[11] 3,744,449
[45] July 10, 1973

[54] ARTICLE HANGING, CONVEYING, AND COATING APPARATUS

[75] Inventors: Barney C. Guttman, Pittsburgh; William J. Suchy, East Pittsburgh; Vicent J. Berardinelli, Murrysville, all of Pa.

[73] Assignee: National Steel Corporation, Pittsburgh, Pa.

[22] Filed: Apr. 28, 1971

[21] Appl. No.: 138,095

[52] U.S. Cl.................. 118/324, 118/503, 294/92
[51] Int. Cl. .......................... B05c 5/00, B05c 11/14
[58] Field of Search.................... 118/500, 503, 324; 198/177 R, 179; 294/82, 85, 92

[56] References Cited
UNITED STATES PATENTS

| | | | |
|---|---|---|---|
| 3,402,909 | 9/1968 | Ely.................................... | 294/92 X |
| 2,920,422 | 1/1960 | Freiberg........................... | 294/92 X |
| 2,542,289 | 2/1951 | Robbins............................ | 294/82 R |
| 2,079,240 | 5/1937 | Bruns................................ | 294/92 |
| 1,237,860 | 8/1917 | Beausejour....................... | 118/500 |
| 1,326,802 | 12/1919 | Strathern.......................... | 294/92 |
| 2,619,372 | 11/1952 | Gardner............................. | 294/92 |

*Primary Examiner*—John P. McIntosh
*Attorney*—Shanley & O'Neil

[57] ABSTRACT

Articles (e.g., aluminum extrusions) are suspended from a conveyor for transport through a continuous painting line. The articles are suspended by hangers, each of which includes a gripper plate swingably connected to a stabilizer plate. The stabilizer plate is rigidly connected to an elongated member which is swingably connected to the conveyor. The gripper plate has slots which receive the articles, and enlarged recesses which allow relative swinging movement between the article and the gripper plate so that the extrusion operatively engages gripper corners of the gripper plate. The gripper corners securely hold the extrusion by action of gravity tending to swing the extrusion in lever fashion to jam the extrusion between the gripper corners.

11 Claims, 10 Drawing Figures

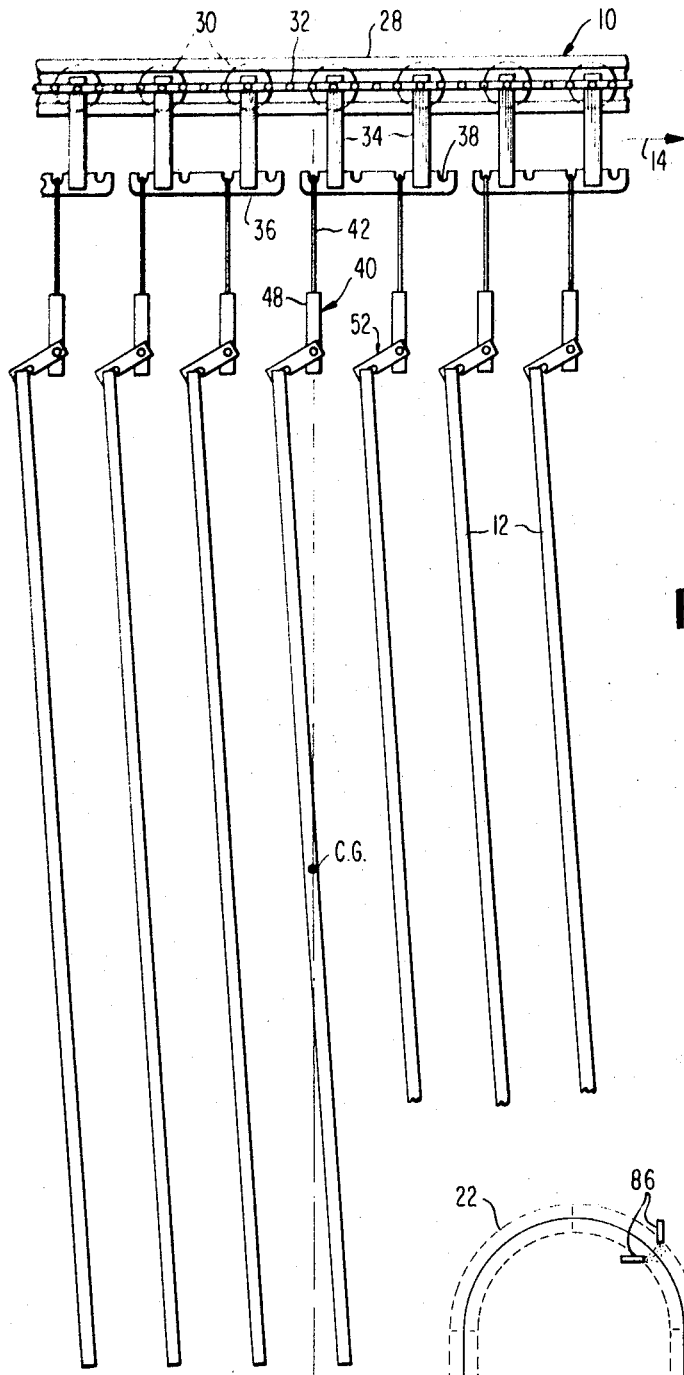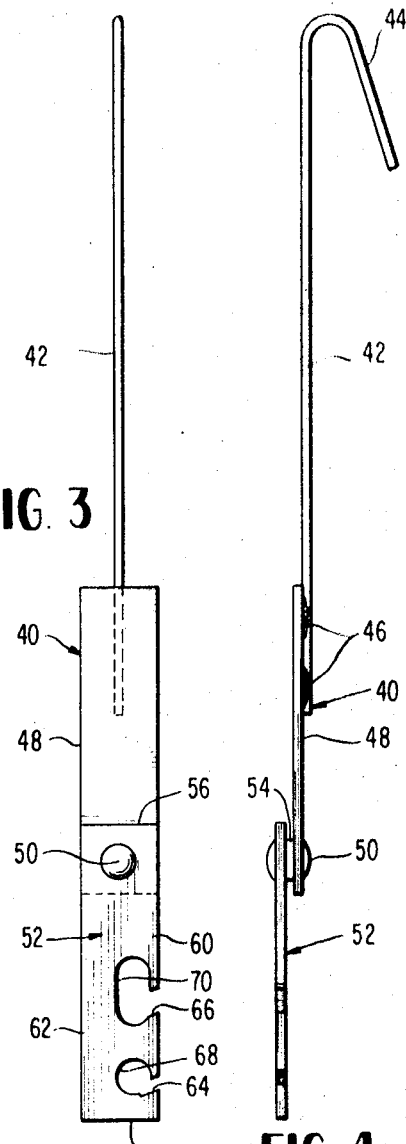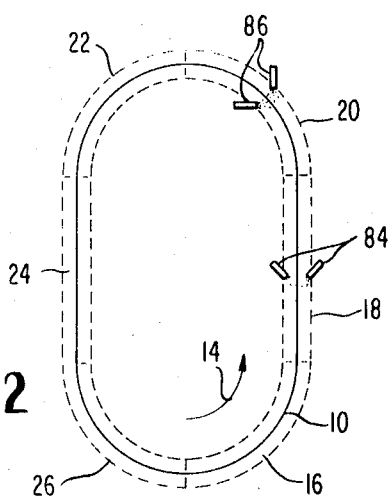
PATENTED JUL 10 1973  3,744,449
SHEET 1 OF 2
FIG. 1
FIG. 2
FIG. 3
FIG. 4
INVENTORS
BARNEY C. GUTTMAN
WILLIAM J. SUCHY
VINCENT J. BERARDINELLI
BY Shanley + Sheil
ATTORNEYS

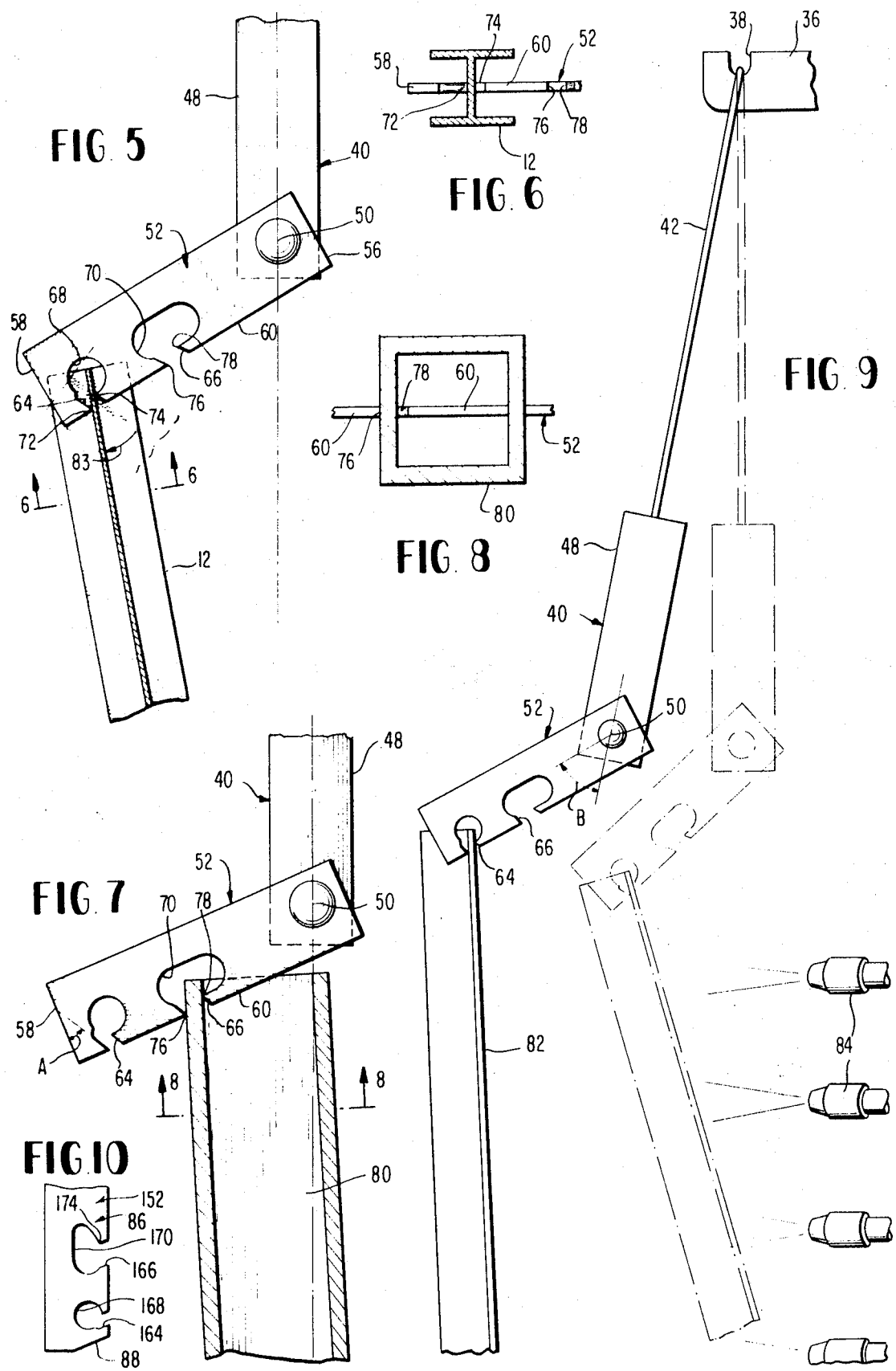

3,744,449

ARTICLE HANGING, CONVEYING, AND COATING APPARATUS

BACKGROUND OF THE INVENTION

This invention relates to article hangers, and more particularly, to hangers for carrying articles through a continuous electrostatic painting line.

A continuous painting line typically includes an endless conveyor from which articles to be painted are suspended. The conveyor carries the articles around a circuit including loading, pretreating, painting, drying and unloading zones. In the continuous painting of elongated aluminum architectural extrusions, the loading of the extrusions (i.e., the hanging of the extrusions on the conveyor) presented serious difficulties. For high-speed, continuous operation of the painting line it was necessary to rapidly load the extrusions onto the conveyor, but the smooth, flat surfaces of the extrusions provided no way for known hangers to hold the extrusions. For lack of a better way to handle the problem, an S-hook was used for the hanger and a hole was drilled in one end of each extrusion. The bottom curl of the S-hook was then passed through the hole at the loading zone. This system was unsatisfactory because the drilling of each extrusion was a time-consuming, costly operation. Furthermore, the drilling operation damaged and defaced the extrusion.

Attempts were made to improve upon the S-hook system, but all known previous attempts produced some disadvantage or deficiency which prevented their being entirely satisfactory. For example, in some instances the hangers failed to retain a secure grip on the extrusions, particularly in the pretreating zones of the painting line where high-pressure liquid sprays are applied to the freely hanging extrusions. Under forces applied by the pressurized liquid, the extrusions were set to swinging and fell out of the hangers.

Accordingly, a need exists for improved article hangers which can be rapidly loaded and off-loaded, yet do not require damaging or defacing the article and further, retain a secure grip on the article. A main object of the invention is the fulfillment of this need.

Other objects and advantages of the invention will appear from the following detailed description, which, when considered in connection with the accompanying drawings, describes a preferred embodiment of the invention for purposes of illustration only and not for definition of the limits of the invention.

BRIEF DESCRIPTION OF THE DRAWINGS

FIG. 1 is a side view showing the general arrangement of coating conveying structure embodying principles of the invention.

FIG. 2 schematically illustrates a continuous coating circuit traversed by the conveyor of FIG. 1.

FIG. 3 is an enlarged side view of article hanger details of the structure of FIG. 1.

FIG. 4 is a front view of the article hanger of FIG. 3.

FIG. 5 is a detail view showing operation of the article hanger of FIG. 3 in handling one type of extrusion.

FIG. 6 is a cross-sectional view on line 6—6 of FIG. 5.

FIG. 7 is another detail view showing operation of the article hanger of FIG. 3 in handling another type of extrusion.

FIG. 8 is a cross-sectional view on line 8—8 of FIG. 7.

FIG. 9 is another detail view showing operation of the article hanger in handling still another type of extrusion, and under action of liquid sprays in the coating line.

FIG. 10 is a detail view of a modification of the article hanger of FIG. 3.

Reference characters with "100" added denote elements similar to the elements designated with the corresponding two-digit character.

DESCRIPTION OF THE PREFERRED EMBODIMENT

FIG. 1 depicts a representative segment of an endless conveyor 10 of a continuous electrostatic painting line. Conveyor 10 carries articles in the form of aluminum extrusions 12 along a direction of travel indicated by directional arrow 14 through a series of zones schematically illustrated in FIG. 2. The sequence of zones includes a loading zone 16, a pretreatment zone 18, a painting zone 20, a heat-drying zone 22, a cooling zone 24 and an unloading zone 26. From unloading zone 26, conveyor 10 returns to loading zone 16 for another trip around the circuit.

Conveyor 10 includes an overhead track 28 (FIG. 1) upon which runs a series of trolley wheels 30. The axles of trolley wheels 30 are joined by a drive chain 32 which moves trolley wheels 30 along track 28. A frame member 34 depends from the axle of each wheel and contiguous frames 34 are joined by cross-piece 36 so that the wheels are paired for travel along the track. Each cross-piece 36 has four detentes 38, into each of two of which is hooked an article hanger 40.

Each article hanger 40 includes an elongated suspending device in the form of a wire 42, by which hanger 40 is suspended from conveyor 10. Wire 42 has a hook 44 (FIG. 4) formed in its top portion. Hook 44 projects transversely to direction 14 (FIG. 1) of conveyor travel and is received in a detente 38 in cross-piece 36 to connect the hanger to conveyor 10 for swinging movement of the hanger relative to the conveyor along the direction of travel of the conveyor. Wire 42 has a generally circular cross-section, to facilitate the swinging movement of the hanger. Wire 42 is rigidly secured by two spot welds 46 (FIG. 4) to a stabilizer member or plate 48.

Stabilizer plate 48 (FIGS. 3, 4) is thin, and is very wide relative to wire 42. Stabilizer plate 48 has a generally rectangular cross-section, with the wide faces of the plate extending along the direction of conveyor travel. The bottom end portion of stabilizer plate 48 rotatably carries a pivot pin 50 which swingably connects the top end portion of a gripper member or plate 52 to stabilizer plate 48. Pivot pin 50 is rotatably mounted in an aperture in gripper plate 52. The pin has an enlarged head portion at each end, to retain the pin in place. A washer 54 is placed between the facing sides of stabilizer plate 48 and gripper plate 52, to facilitate free relative movement between the gripper and stabilizer plates. Pivot pin 50 extends transversely to the direction of conveyor travel, so that the gripper plate 52 swings along the direction of travel of the conveyor.

Gripper plate 52 securely holds the extrusion by gravity action. The gripper plate is generally equal in width to the stabilizer plate and this factor in combination with the appreciable width of both plates prevents the plates from twisting relative to one another. Gripper plate 52 is rectangular in cross-section. The gripper plate includes a top edge portion 56, a bottom edge portion 58, and two opposite side edge portions 60, 62 which lead and follow respectively, with reference to the direction of conveyor movement.

Gripper plate 52 includes two slots 64, 66, each of which functions to receive a portion of an extrusion to be painted. Each slot extends inwardly from leading edge portion 60 of gripper plate 52, so that the slots face in the direction of conveyor travel. The slots slant inwardly in a direction toward bottom edge portion 58 of gripper plate 52, so that a geometric projection of the lower wall of the slot lies at an acute angle A (FIG. 7) with the bottom edge wall of gripper plate 52.

Gripper plate 52 also includes two recesses 68, 70 which are located at the inner end portion of slots 64, 66 respectively. Recesses 68, 70 are enlarged relative to the associated slots, for providing clearance for relative swinging movement between an extrusion and the gripper plate to bring the extrusion into securely gripped position as will be hereinafter described in detail. Slots 64, 66 are stubby or short, whereby enlarged recesses 68, 70 are adjacent leading edge portion 60 of gripper plate 52 as opposed to being in the central region of the gripper plate. Each slot 64, 66 opens into the associated enlarged recess generally tangentially to the recess on the bottom side of the recess, which extends beyond the slot toward the top edge portion 56 of gripper plate 52.

Gripper plate 52 includes pairs of opposed, coacting gripper corners which are spaced across each of slots 64, 66 and are positioned for action of gravity on the extrusions to hold the extrusions between the gripper corners. The two gripper corners associated with lower slot 64 are respectively indicated at 72 and 74 in FIG. 5. Gripper corner 72 is contiguous to leading edge portion 60 of gripper plate 52 on the bottom side of slot 64 (i.e., the side of the slot nearer to bottom edge portion 58 of the gripper plate). The other gripper corner 74 is contiguous to enlarged recess 68 on the side of slot 64 which is nearer to top edge portion 56 of gripper plate 52. Each gripper corner 72, 74 is defined by intersections of two walls. Thus, gripper corner 72 is defined by intersection of the leading edge wall of gripper plate 52 with the bottom wall of slot 64. Gripper corner 74 is defined by the intersection of the wall of enlarged recess 68 with the top wall of slot 64.

Gripper corner 76 bears a structural and functional relationship to slot 66 which corresponds to that of gripper corner 72 relative to slot 64. Similarly, gripper corner 78 corresponds in its relationship to slot 66 to the relationship which gripper corner 74 has to slot 64.

Slots 64, 66 are of varying widths for receiving articles of varying thickness. This is to provide the hanger with broad flexibility in having capacity to carry articles of widely varying gages (i.e., thicknesses) through the coating line. Enlarged recesses 68, 70 vary in size in accordance with the width of the associated slots, i.e., the wider the slot the larger the associated recess to assure adequate clearance for relative movement between the extrusion and the gripper plate to place the extrusion into position to be gripped by the gripper corners. Exemplary dimensions for the slots and enlarged recesses are provided hereinbelow. Manifestly, more or fewer than two slots can be provided. If it is desirable to have the capacity for handling articles of a thicker gage than would fit into slot 66, a third slot, wider than slot 66, can be provided with gripper plate 52 being elongated to provide the necessary space for provision of the third slot and associated enlarged recess. In the embodiment illustrated, enlarged recess 68 has a generally circular shape. Enlarged recess 70 has a generally oval-shaped configuration to allow more clearance for thicker extrusions while avoiding excessive weakening of the gripper plate by retaining a wide unbroken cross-section of plate material.

The wide degree of flexibility of hanger 40 is further illustrated by FIGS. 5-9. In FIGS. 5 and 6, an extrusion 12 having the cross-sectional shape of an H-beam is shown securely gripped by the gripper corners 72, 74 associated with narrow slot 64. The gripper corners are shown gripping the web of the beam, with the beam flanges being generally parallel to the wide faces of the gripper plate. In FIGS. 7 and 8, gripper plate 52 is shown gripping a heavy-gage extrusion 80 between gripper corners 76, 78 associated with wide slot 66. Extrusion 80 has a hollow square or box-shaped cross-section. Because of the greater thickness of this extrusion, it is inserted into wider slot 66. One wall of the square is inserted into the slot and gripped by the gripper corners. In FIG. 9, gripper plate 52 is shown gripping one leg of a right-angle-shaped extrusion 82 between the gripper corners associated with narrow slot 64. It will be apparent that hanger 40 is not only of great flexibility in terms of gage of the extrusions which can be handled, but also has universality in terms of the shape of the sections which can be gripped. In one plant, about 5,000 differently-shaped extrusions are handled by the hangers illustrated.

In use, the hangers which approach loading station 16 (FIG. 2) are empty. Gravity pulls on the hanger so that stabilizer plate 48 and gripper plate 52 extend straight downwardly as illustrated in FIG. 3. At the loading station, the upper end of an extrusion is inserted into a gripper slot with the extrusion in an orientation relative to the slot such as the extrusion shown in phantom lines is in relation to slot 64 in FIG. 5. This action is effected by an operator, and it will be appreciated that this relationship between the extrusion and gripper plate 52 can be established by swinging the gripper plate relative to the extrusion, by swinging the extrusion relative to the gripper plate, or by swinging each relative to the other. And it is emphasized that it is the relative position of these parts which is of importance, not the absolute orientation of either relative to a horizontal datum. For example, for insertion of an extrusion which is very long (e.g., 20 feet), the extrusion is advantageously oriented vertically and the gripper plate is swung upwardly on its pivot to an angle at which insertion of the vertical extrusion into slot 64 is possible.

After insertion of the extrusion, relative swinging movement between the gripper plate and extrusion is effected so that, in effect, the extrusion moves relative to gripper plate 52 from the phantom line position of FIG. 5 along directional arrow 83 to the solid line position and thus into position to be gripped between gripper corners 72, 74. Again it is stressed that it is the relative movement between the parts that is under discussion, and such movement can be effected by moving either or both of the gripper plate and the extrusion relative to an external reference point to bring the parts into the solid-line positions of FIG. 5.

With the extrusion between gripper corners 72, 74 as shown, the extrusion is slowly released by the operator and allowed to gradually come under control of gravity. The extrusion will assume an angle of orientation relative to the vertical, such as is shown in FIG. 1, the exact size of the angle depending on the weight and length of the extrusion and other factors governing the mechanics of the system. The pivotal mounting of the gripper plate permits this action. The center of gravity of the extrusion will come to rest directly under the stabilizer plate as shown in FIG. 1, and the action of gravity on the extrusion jams the extrusion between the gripper corners so that the gripper corners establish and maintain a firm grip on the extrusion, notwithstanding the immobility of the gripper corners per se. Actually, gravity makes of the extrusion a lever, forcing the extrusion against, and swinging the extrusion clockwise about, gripper corner 72 (FIG. 5) as a fulcrum, and thus forcing the upper tip of the extrusion against gripper corner 74 to establish a secure grip on the extrusion. The conveyor then carries the extrusion out of the loading zone into the pretreatment zone 18 (FIG. 2).

In pretreatment zone 18, sprays of cleaning liquid, and of liquid chemicals which enhance paint-bonding, are directed onto the moving extrusions from spray nozzles such as 84 (FIGS. 2, 9). The sprayed liquid is under pressure and the sprays are directed onto the incoming extrusions at an angle in opposition to the direction of movement of the extrusions so that a vectorial component of the spray forces opposes the direction of travel of the conveyor. The sprays apply forces to the extrusion and the direction of these forces tends to swing the hanging extrusions. The extrusions tend to swing in a direction along the direction of movement of the conveyor because of the orientation of the spray forces. However, hangers in accordance with the invention retain a secure grip on the extrusions. As shown in FIG. 9, forces applied by liquid sprays from nozzles 84 are absorbed by swinging of wire 42 in detente 38 on conveyor cross-piece 36 so that the parts swing from the phantom line position of FIG. 9 to the solid line position. Absorption of the spray forces is also effected by swinging of gripper plate 52 on pivot 50 relative to stabilizer plate 48, and without the swinging of wire 42 on conveyor cross-piece 36, all of the forces applied by the sprays would have to be taken up by the swinging of gripper plate 52. If angle B of the gripper plate relative to the stabilizer plate became too large, i.e., if the gripper plate swung too far, extrusion 82 would fall out of the gripper plate. However, because swinging of wire 42 on conveyor cross-piece 36 absorbs some of the spray forces, the angle B of inclination of the gripper plate which needs to be assumed in absorption of the spray forces is reduced. With the swinging movement at the conveyor connection, angle B is minimized so that the gripper plate retains a firm grip on the extrusion. The long length of gripper plate 52 also aids in maintaining angle B at a minimum, as does the shortness or stubbiness of the slots in the gripper plate.

After pretreatment, the conveyor carries the objects on through the circuit for electrostatic painting by liquid sprays from nozzles 86 (FIG. 2). The painted extrusions are then carried through an oven in drying zone 22, and through cooling zone 24 to unloading zone 26. At the unloading zone, an operator supports the extrusion so that gravity no longer is in control and the operator effects relative movement between the gripper plate and the extrusion in directions opposite to the movements of the above-described loading sequence, to move the extrusion out of engagement with the gripper corners and extract the extrusion from the slot.

As a specific example, a steel hanger having the following dimensions is satisfactory for handling elongated aluminum architectural extrusions: Height of gripper plate:
4⅛ inches; width of gripper plate: 1-⅛ inch; thickness of gripper plate: one-eighth inch; width of lower slot: three-sixteenths inch; length of lower slot: one-eighth inch at top; diameter of lower enlarged recess: one-half inch; width of upper slot: five-sixteenths inch; length of upper slot: one-eighth inch at top; height of upper enlarged recess fifteen-sixteenths inch; width of upper enlarged recess: one-half inch; height of stabilizer plate: 4-¼ inches; width of stabilizer plate: 1-⅛ inch; thickness of stabilizer plate: one-eighth inch; height of wire: 9-¾ inches; diameter of wire: one-eighth inch; angle A: 25°.

Apparatus according to the invention are highly advantageous. Loading and unloading of articles from a conveyor can be done rapidly and efficiently and without damage to or defacing of the extrusions. The gripper plates are simple in construction, and establish a secure grip on the articles by action of gravity without moving gripper parts and retain this sure grip notwithstanding subjection of the articles to pressure sprays in the painting line. The swinging of the wire hook in coaction with the pivot mounting of the gripper plate allows absorption of spray forces and the swinging of the wire on the conveyor reduces the necessary angle of inclination which the gripper plate must assume so that there is no danger of the extrusion falling out of the hanger. The roundness and smallness of wire diameter promotes the swinging of the hook on the conveyor.

The article hangers have a universal capability, being useful for handling thousands of differently-shaped sections. The articles need not be aluminum extrusions; articles of an infinite number of shapes and sizes can be handled so long as a portion can be inserted into the gripper slot in the fashion described hereinabove.

In the modification of FIG. 10, generally ovalshaped, enlarged recess 170 in gripper plate 152 has a filled-in corner portion 86 which strengthens the projecting portion of the hanger upon which gripper corner 174 is located. Also, gripper plate 152 has the leading-side, bottom corner cut away and replaced by a sloping wall 88. This facilitates handling of hollow shapes because the shorter length of plate between slot 164 or slot 166 and wall 88 can be slipped into hollow extrusions having smaller internal dimensions. Many other modifications of the preferred embodiment can be made without departing from the principles of the invention, which principles are set forth in the appended claims.

We claim:
1. Coating structure, comprising
   means defining a series of zones including at least a loading zone, a coating zone, and an unloading zone,
   a conveyor for carrying articles to be coated along a direction of travel through the series of zones,
   at least one of the zones including means for directing at least one spray of fluid onto the articles at an angle in opposition to the direction of travel of the conveyor,
   a plurality of article hangers suspended from the conveyor,
   each article hanger including a gripper member having a top edge portion, a bottom edge portion, and opposite side edge portions, one side edge portion leading and the other side edge portion following in the direction of conveyor travel, a stabilizer member, the top edge portion of the gripper member having a central portion, first connecting means connecting the central portion of the top edge portion of the gripper member to the stabilizer member for swinging movement of the gripper member along the direction of travel of the conveyor under action of the spray, and suspending means operatively associated with the stabilizer member for suspending the hanger from the conveyor, the suspending means including second connecting means for connecting the article hanger to the conveyor for swinging movement of the article hanger along the direction of travel of the conveyor under action of the spray, the gripper member including means defining a plurality of slots of varying width spaced along the leading side edge portion of the gripper member, each slot extending inwardly from the leading side edge portion of the gripper member and having an inner end portion, one of the slots receiving a portion of an acticle, means defining an enlarged recess at the inner end portion of each slot for providing clearance for relative swinging movement between the article and the gripper member at the loading and unloading zones to load and unload the article hanger, the enlarged recesses varying in size in accordance with the width of the respective slots, each enlarged recess being adjacent to the leading side edge portion of the gripper member, and opposed gripper portions spaced across each slot and spaced along each slot for gravity to lever the article about one gripper portion and against another gripper portion to jam the article between the gripper portions.

2. The structure of claim 1,
the plurality of slots consisting of two slots,
the enlarged recess associated with the narrower of the two slots having a generally circular shape,
the enlarged recess associated with the wider of the two slots having a generally oval shape.

3. The structure of claim 1,
each slot slanting inwardly in a direction toward the bottom edge portion of the gripper member.

4. The structure of claim 1,
each gripper portion including a gripper corner.

5. The structure of claim 1,
the gripper portions associated with each slot consisting of a pair of opposed gripper corners,
one gripper corner being contiguous to the leading side edge portion of the gripper member on a side of the slot nearer to the bottom edge portion of the gripper member,
the other gripper corner being contiguous to the associated enlarged recess on a side of the slot nearer to the top edge portion of the gripper member.

6. The structure of claim 5,
each gripper corner being defined by two intersecting walls,
one of the walls of said one gripper corner forming part of the leading side edge portion of the gripper member,
the other of the walls of said one gripper corner being a wall of the associated slot,
one of the walls of said other gripper corner being a wall of the associated enlarged recess,
the other of the walls of said other gripper corner being another wall of the associated slot.

7. The structure of claim 1,
each slot communicating with the associated enlarged recess on a side of the enlarged recess adjacent to the bottom edge portion of the gripper member,
each enlarged recess extending beyond the associated slot toward the top edge portion of the gripper member.

8. The structure of claim 1,
the gripper member and the stabilizer member being of generally equal width.

9. The structure of claim 1,
the suspending means including an elongated member having a generally circular cross-section,
the second connecting means including a hook.

10. The structure of claim 9,
the elongated member being rigidly secured to the stabilizer member,
the gripper member and the stabilizer member being of generally equal width.

11. The structure of claim 1,
the connecting means including a pivot member.

* * * * *